(12) United States Patent
Beaujot

(10) Patent No.: US 6,708,775 B2
(45) Date of Patent: Mar. 23, 2004

(54) FIELD MARKER FOR IMPLEMENTS

(75) Inventor: Norbert Beaujot, Saskatchewan (CA)

(73) Assignee: Straw Track Manufacturing Inc., Langbank (CA)

( * ) Notice: Subject to any disclaimer, the term of this patent is extended or adjusted under 35 U.S.C. 154(b) by 0 days.

(21) Appl. No.: 10/152,985

(22) Filed: May 23, 2002

(65) Prior Publication Data
US 2002/0189826 A1 Dec. 19, 2002

(30) Foreign Application Priority Data
May 24, 2001 (CA) .............................................. 2348796

(51) Int. Cl.⁷ .............................................. A01B 69/02
(52) U.S. Cl. ...................... 172/126; 172/311; 172/501
(58) Field of Search ................................. 172/126, 127, 172/128, 129, 132, 311, 501

(56) References Cited

U.S. PATENT DOCUMENTS

| 1,113,378 A | * | 10/1914 | Simmons | 172/657 |
|---|---|---|---|---|
| 4,583,598 A | * | 4/1986 | Knels | 172/126 |
| 4,825,957 A | | 5/1989 | White | |
| 5,027,525 A | | 7/1991 | Haukaas | |
| 5,425,427 A | | 6/1995 | Haugen | |
| 5,542,190 A | * | 8/1996 | Wahls | 33/624 |
| 5,785,128 A | * | 7/1998 | Redekop | 172/126 |
| 5,957,216 A | | 9/1999 | Redekop | |
| 6,079,114 A | * | 6/2000 | Toews | 33/624 |
| 6,112,827 A | * | 9/2000 | Reiber et al. | 172/311 |
| 6,125,944 A | | 10/2000 | Redekop | |
| 6,131,669 A | * | 10/2000 | Friggstad et al. | 172/311 |
| 6,167,972 B1 | * | 1/2001 | Hundeby et al. | 172/501 |
| 6,192,994 B1 | * | 2/2001 | Friggstad et al. | 172/311 |
| 6,202,756 B1 | * | 3/2001 | Hundeby et al. | 172/311 |
| 6,257,343 B1 | * | 7/2001 | Maenle et al. | 172/126 |
| 6,263,976 B1 | * | 7/2001 | Hundeby | 172/126 |
| 6,334,491 B1 | * | 1/2002 | Nevin | 172/126 |
| 2001/0042629 A1 | * | 11/2001 | Hundeby | 172/266 |

FOREIGN PATENT DOCUMENTS

CA  2326971 A  * 11/2000  ............ A01B/69/02

* cited by examiner

Primary Examiner—Robert E. Pezzuto
Assistant Examiner—Alexandra K. Pechhold
(74) Attorney, Agent, or Firm—Nixon & Vanderhye P.C.

(57) ABSTRACT

A field marker attachable to an outer end of an agricultural implement comprises an arm pivotally attachable to the implement extending perpendicular to the travel direction. A marking device is attached at a distal end of the arm. An extendable hydraulic cylinder is attached to the arm and implement and moves in one direction to a stopped position where the arm is in the operating position. An active hydraulic source supplies hydraulic fluid at an operating pressure such that the cylinder remains at the stopped position until a rearward force on the arm causes the pressure in the cylinder to exceed the operating pressure and the arm moves rearward. Where the marking device scores the field, a wheel can be mounted on the arm such that its axis of rotation is removed from the center of the wheel so that the scoring device moves up and down scoring an intermittent line.

34 Claims, 5 Drawing Sheets

FIELD MARKER FOR IMPLEMENTS

FIELD MARKER FOR IMPLEMENTS

This invention is in the field of agricultural implements and in particular markers to enable an implement operator to follow a desired path relative to a previous implement pass.

BACKGROUND

Field markers are used in many farm operations, including seeding, tillage, chemical application and fertilizer application. Field markers generally include a marking device on the end of an arm to make a visible mark on the ground laterally offset from the implement to give the driver a visible guide for spacing the implement on the next pass. The markers can include a disc or a tooth which scores a line in the field, or may they may deposit foam, dye, paper or the like on the ground or crop to provide the mark.

With the evolution of wider field equipment field markers are becoming more important as a driving aid to reduce overlaps and misses. Wider implements make it more difficult for the operator to judge accurately the path to drive in order for the implement to follow the correct path with respect to the previous implement path. High input costs for seed, fertilizer, chemicals, fuel and so forth make overlaps costly, and misses provide no return on the implement operation, and lead to further problems, such as weeds, in the future.

Markers have evolved for these wide pieces of equipment where it is not uncommon to have a marker arm reach thirty feet to the side of an implement. Markers are being built strong and heavy to withstand the highly leveraged forces exerted because of the length of these markers, combined with the varying forces on the scoring device, and the variable and often unknown forces resulting from impact with fences, power poles, badger holes, ditches and rough terrain. The marker must also be strong enough to withstand forces inherent due to the markers' own weight.

These strong and heavy marker arms are expensive and contribute unwanted and sometimes harmful weight and other forces to the outside extremities of the implement they are mounted to. The added weight contributes to implement wings sinking into mud, increased forces required to raise wings for transport, and so forth. Because of the extreme length of the markers, relatively small forces on the outer end of the marker translate to considerable forces that must be absorbed by the mounting apparatus and the implement.

There is considerable prior art in the area, including U.S. Pat. Nos. 6,125,944 and 5,785,128 to Redekop, U.S. Pat. No. 5,542,190 to Wahls, U.S. Pat. No. 5,425,427 to Haugen, and U.S. Pat. No. 5,027,525 to Haukaas. Breakaways using shear pins, bolts, trips or the like are required to allow the marker to move back when it contacts an obstacle, thus avoiding or at least reducing damage from the contact. When the breakaway acts, it is generally required to stop operations and reset the marker in the operating position. Particular breakaways for field markers are disclosed in U.S. Pat. Nos. 5,957,216 to Redekop and 4,825,957 to White et al.

The breakaway of White is particularly addressed to overcoming nuisance failures of conventional breakaways. These nuisance failures occur when the breakaway trips during normal field use when no obstacle is encountered which should cause the breakaway to trip. Such nuisance failures are caused by constant flexing and resulting fatigue of the shear pin or bolt or other mechanism.

A common problem when using present field markers is seeing the furrow scored in the field. Typically a field will have numerous furrows, ridges and so forth that are made by previous operations of various implements. These are often substantially parallel to the mark that the operator is following, with the result that it is difficult to distinguish the mark to be followed from these prior furrows, ridges, and the like.

SUMMARY OF THE INVENTION

It is the object of the present invention to provide a field marker that has considerably less weight than conventional markers.

It is a further object of the present invention to provide a marker with a breakaway that resets automatically and that virtually eliminates the nuisance failures common to conventional marker breakaways.

It is a further object of the present invention to provide a marker that scores a mark in the field that is distinguishable from the other furrows and ridges commonly present on the surface of a field.

In a first aspect the invention provides a field marker attachable to an outer end of an agricultural implement for providing a visible mark in the field substantially parallel to a path of the implement and laterally removed from the implement. The marker comprises an arm pivotally attachable at a proximal end thereof to an outer end of the implement at an implement attachment point such that the arm can move up and down to follow contours of the field and such that the arm can move from an operating position, where the arm extends outward from the outer end of the implement, rearward to a retracted position. A marking device is attached at a distal end of the arm and is operative to provide a visible mark in the field below the marking device. An extendable hydraulic cylinder is operatively connected between the implement and the arm such that the hydraulic cylinder moves in a first direction to a stopped position to move the arm to the operating position, and such that the hydraulic cylinder moves in an opposite second direction when the arm moves to the retracted position. An active hydraulic source is operatively connected to the hydraulic cylinder to supply hydraulic fluid to the hydraulic cylinder at an operating pressure such that the hydraulic cylinder remains in the stopped position until a rearward force exerted on the arm causes the pressure of the hydraulic fluid in the hydraulic cylinder to exceed the operating pressures, at which time the hydraulic cylinder moves in the second direction and the arm moves toward the retracted position.

In a second aspect the invention provides a field marker attachable to an agricultural implement for providing a visible mark in the field substantially parallel to a path of the implement and laterally removed from the implement. The marker comprises an arm pivotally attachable at a proximal end thereof to an outer end of the implement at an implement attachment point such that the arm can move up and down to follow contours of the field and such that a distal end of the arm can move from an operating position, where the distal end extends outward from the outer end of the implement, rearward to a retracted position. A marking device is attached at the distal end of the arm and is operative to provide a visible mark in the field below the marking device. An extendable hydraulic cylinder is operatively connected to the arm such that the hydraulic cylinder moves in a first direction to a stopped position to move the distal end of the arm to the operating position, and such that the hydraulic cylinder moves in an opposite second direction when the distal end of the arm moves to the retracted position. An active hydraulic source is operatively connected to the hydraulic cylinder to supply hydraulic fluid to the hydraulic cylinder at an operating pressure such that the hydraulic cylinder remains in the stopped position until a rearward force exerted on the arm causes the pressure of the hydraulic fluid in the hydraulic cylinder to exceed the operating pressure, at which time the hydraulic cylinder moves in the second direction and the distal end of the arm moves toward the retracted position.

Breakaway protection for the field marker is provided by a hydraulic cylinder supplied with hydraulic fluid by an active hydraulic source such as is commonly used to supply hydraulic cylinders to replace springs in various implement applications. The pressure of the hydraulic fluid can be set so that the arm will swing back when only slightly larger than normal forces are encountered, as when striking an obstacle. The arm will automatically return to the operating position when the force on the arm reduces to normal, as when the obstacle is cleared. No pins or trip mechanisms are needed which are subject to wear and fatigue, and so nuisance failures, where the arm moves rearward while in normal operation, are virtually eliminated. If the arm moves rearward in normal operation of the marker of the invention, the pressure of the hydraulic fluid can be increased. Optimum protection of the arm is obtained when the pressure is just high enough overcome the rearward drag exerted by the marking device while operating in normal soil conditions, so that when an obstacle of some kind is encountered, increasing this drag, the arm will move rearward.

A control can be used to vary the operating pressure to suit varying conditions and also to control the speed of movement of the arm. A one way dump valve can allow the arm to move rearwards quickly, and then move back to the operating position slowly, reducing shock forces. The complete operation can be controlled by two simple on-off switches. The operator can choose to activate one marker or both markers at the same time The field marker of the invention can be built very light and still perform the required functions. The marker can be built economically and does not require the driver to stop to reset or repair the mark arm even after hitting a major obstacle like a power pole. The new marker contributes far less weight to the outside of the implement, and the reduced weight reduces forces exerted on the marker by its own weight.

The same active pressure source can be supplied to the hydraulic cylinder for moving the arm into a transport position. The resulting preset active pressure reduces the risk of damage to the arm if high forces become present for any reason. This further reduces the strength and weight requirements of the arm and again reduces the forces exerted on the implement.

A lift cable can be provided that has its anchor point on its implement end above and offset from the arms pilot. The anchor point and cable are arranged such that the cable becomes loose when the marker is in the operating position to allow the scoring device to contact the ground with gravitational forces. The anchor point and cable are also arranged such that when the arm is pivoted into the stored position, the cable becomes taut and lifts the end of the marker off the ground. The cable length can be adjusted to vary the lifting height. This strong, economic, yet dependable, lifting apparatus further contributes to a marker arm that reduces weight and forces on the equipment.

The marking device can be a single harrow tooth (or similarly fabricated tool) as a scoring device. Such a marking device inherently has less weight and contributes less draft forces than typical disk markers. Alternatively a paper, dye, or foam marker could be used such that no rearward force is normally exerted on the marker.

A light weight caster wheel could be provided at a portion inward from the markers' outside extremity and set to control the depth and the downward force on the scoring device and thus reduce the draft forces on the marker arm.

In a third aspect the invention provides a field marker attachable to an outer end of an agricultural implement for scoring a visible mark in the field substantially parallel to a path of the implement and laterally removed from the implement. The marker comprises an arm pivotally attachable at a proximal end thereof to an outer end of the implement at an implement attachment point such that the arm extends outward from the outer end of the implement in an operating position where the arm can move up and down to follow contours of the field. A scoring element is attached at a distal end of the arm and is operative to score a visible mark in the field below the scoring element. Means are provided to raise and lower the scoring element such that the scoring element moves down into contact with the field and up out of contact with the field as the marker moves along the field.

Conveniently a wheel supports the arm at an outer portion thereof and the wheel is rotatably attached to an axle at an axis of rotation removed from a center of the wheel such that the scoring element moves down into contact with the field and up out of contact with the field as the marker moves along the field.

As the marker is lifted and lowered, the resulting scored mark is intermittent and makes it easier for the operator to distinguish from continuous lines, such as ridges and furrows, present in the field from other field activities. As the marker is lifted and lowered, residue is better cleared off of the scoring device and there is less overall draft.

Another aspect of the present invention is to provide a marker as previously described that is primarily fabricated using light weight materials such as aluminum, plastics and/or fiberglass. This further reduces the strength and weight requirements of the device and contributes lower adverse forces to the implement.

Using some of the above combinations, large markers can be built that weigh only a fraction of the weight of other markers on the market, as well as significantly reducing forces that are detrimental to the implement to which the markers are mounted.

The present invention can be incorporated with marker arms that are fabricated as a single long arm that folds vertically or horizontally, marker arms that are fabricated to include a telescoping feature as well as a folding feature, and marker arms that are fabricated to include a multitude of folding portions on the arm; such additional folding features may fold portions of the arm vertically or horizontally.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
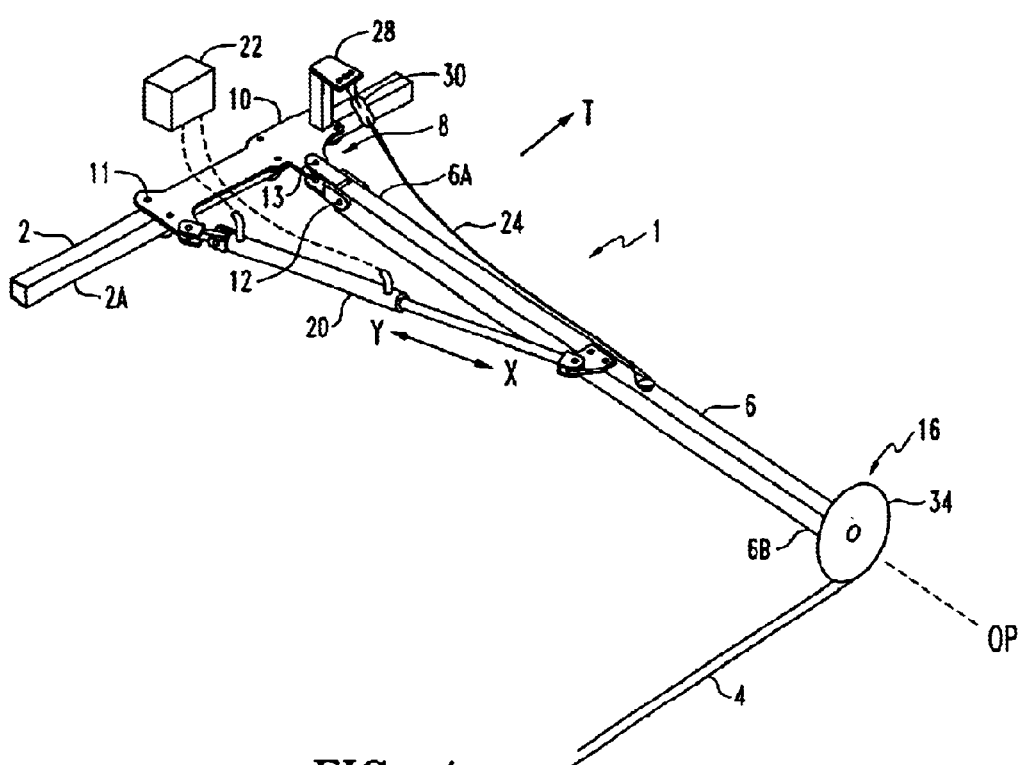
FIG. 1 is a perspective view of an embodiment of the invention mounted on the outer end of an implement.

FIG. 1 illustrates a field marker 1 attachable to an agricultural implement 2 for providing a visible mark 4 in the field substantially parallel to a path of the implement 2 and laterally removed from the implement 2. Since the agricultural implement 2 can be a seeder, cultivator, sprayer or the like, only a typical outer end 2A is illustrated. The implement 2 moves in an operating travel direction T.

Figure 2:
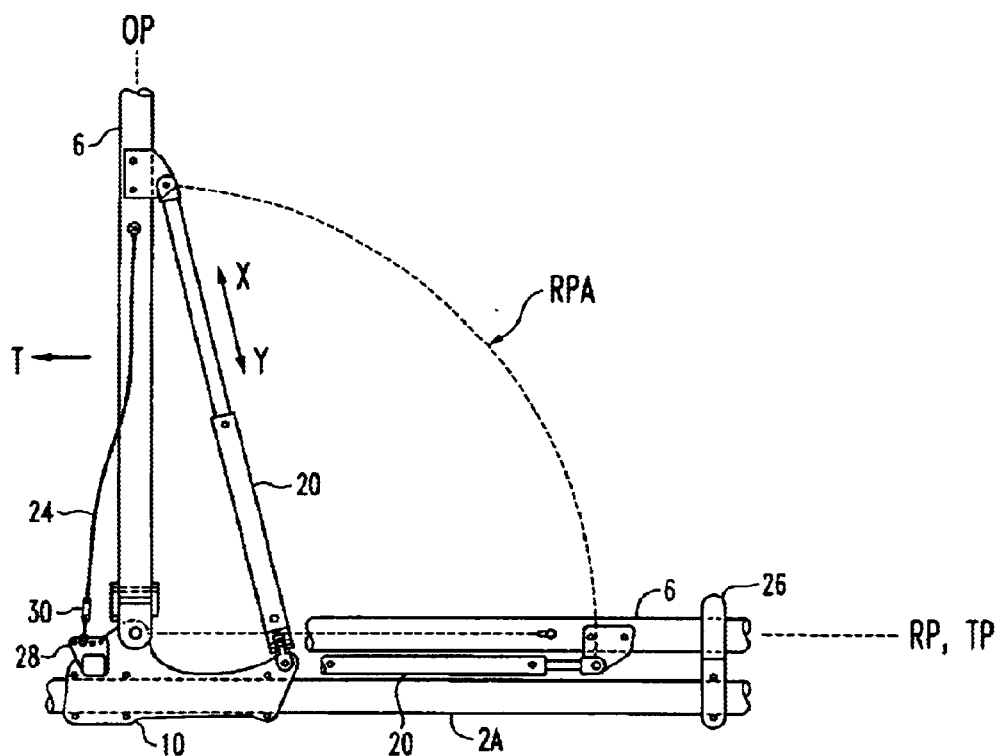
FIG. 2 is a top view of the embodiment of FIG. 1.

The marker 1 comprises an arm 6 pivotally attachable at a proximal end 6A thereof to an outer end 2A of the implement 2 at an implement attachment point 8 such that the arm 6 can move up and down to follow contours of the field and such that the arm 6 can move from an operating position OP as illustrated in FIG. 1, where the arm 6 extends outward from the outer end 2A of the implement 2, rearward to a retracted position RP, as illustrated in FIG. 2. The retracted position RP can be anywhere on the arc RPA which illustrates the path of the arm 6 as it moves rearward from the operating position OP.

As illustrated in FIG. 1, the pivotal attachment is accomplished by attaching a mounting plate 10 to the outer end 2A of the implement 2 with U-bolts 11. The proximal end 6A of the arm 6 is attached about horizontal pin 12 and vertical pin 13 so as to enable movement of the arm 6 up and down about the horizontal pin 12, and frontward and rearward about the vertical pin 13.

A marking device 16 is attached at a distal end 6B of the arm 6 and is operative to provide a visible mark 4 in the field below the marking device 16.

An extendable hydraulic cylinder 20 is operatively connected between the implement 2 and the arm 6 such that the hydraulic cylinder 20 moves in a first direction X to a stopped position to move the arm 6 to the operating position OP, and such that the hydraulic cylinder 20 moves in an opposite second direction Y when the arm moves to the retracted position RP at some point on the arc RPA.

An active hydraulic source 22 is operatively connected to the hydraulic cylinder 20 to supply hydraulic fluid to the hydraulic cylinder 20 at an operating pressure such that the hydraulic cylinder 20 remains in the stopped position until a rearward force exerted on the arm 6 causes the pressure of the hydraulic fluid in the hydraulic cylinder 20 to exceed the operating pressure, at which time the hydraulic cylinder 20 moves in the second direction Y and such that the arm 6 moves toward the retracted position RP. When the rearward force exerted on the arm 6 is reduced so that the pressure of the hydraulic fluid in the hydraulic cylinder 20 falls to the operating pressure the hydraulic cylinder 6 moves in direction X to the stopped position, unless obstructed.

Such active hydraulic sources are conventionally used to supply hydraulic cylinders that apply down pressure on furrow openers for example. The cylinder acts somewhat like a spring, however can maintain the same force over the total length of its extension. A pressure control can be incorporated to vary the operating pressure, and thus the force exerted on the arm 6.

As illustrated, the stopped position of the hydraulic cylinder 20 is the fully extended position when the arm 6 is in the operating position OP. The stop is conveniently provided by the hydraulic cylinder 20 itself. When moving in direction X the hydraulic cylinder 20 is extending, and when moving in direction Y the hydraulic cylinder 20 is retracting. Those skilled in the art will recognize that other configurations would provide a similar result. For example the hydraulic cylinder 20 could be mounted in front of the arm 6, so that it was fully retracted in when the arm 6 is in the operating position OP, and extended when the arm moves to a retracted position on the arc RPA. Similarly, the stop could be provided externally by a chain or a fixed member.

The hydraulic cylinder 20 is double acting. A directional control is incorporated in the hydraulic source 22 to direct pressurized hydraulic fluid to either end of the barrel of the hydraulic cylinder 20. Thus the hydraulic fluid can move the hydraulic cylinder 20 in the second direction Y such that the arm 6 is moved rearward to a retracted position RP on the arc RPA. As illustrated in FIG. 2, the configuration allows the arm 6 to be moved rearward to a retracted position RP that provides a transport position TP substantially parallel to the operating travel direction T and adjacent to the outer end 2A of the implement 2. If an obstruction is in the way of the arm 6 as it moves to the transport position TP, it will stop.

In the illustrated embodiment, a mechanism is provided to raise the arm 6 off the ground when the arm 6 is moved rearward into the transport position TP. The mechanism comprises a cable 24 attached at a first end thereof to the implement 2 at a vertical location above the implement attachment point 8 and attached at a second end thereof to the arm 6. The cable 24 is operative to raise the arm 6 to engage a U-shaped transport bracket 26 when the arm 6 moves rearward to the transport position TP.

To provide the vertical location above the implement attachment point 8, a cable tower 28 is attached to the mounting plate 10 and then the first end of the cable 24 is attached to the cable tower 28. When the arm 6 is in the operating position OP the cable 24 is slack, allowing the arm 6 to move up and down to follow the ground.

In the embodiment illustrated in FIGS. 1 and 2, the cable 24 is attached to the cable tower 28 at a point forward of the implement attachment point 8. It can thus be seen that as the arm 6 moves rearward towards the transport position TP, the cable 24 tightens and lifts the arm 6 to engage the transport bracket 26.

Figure 3:
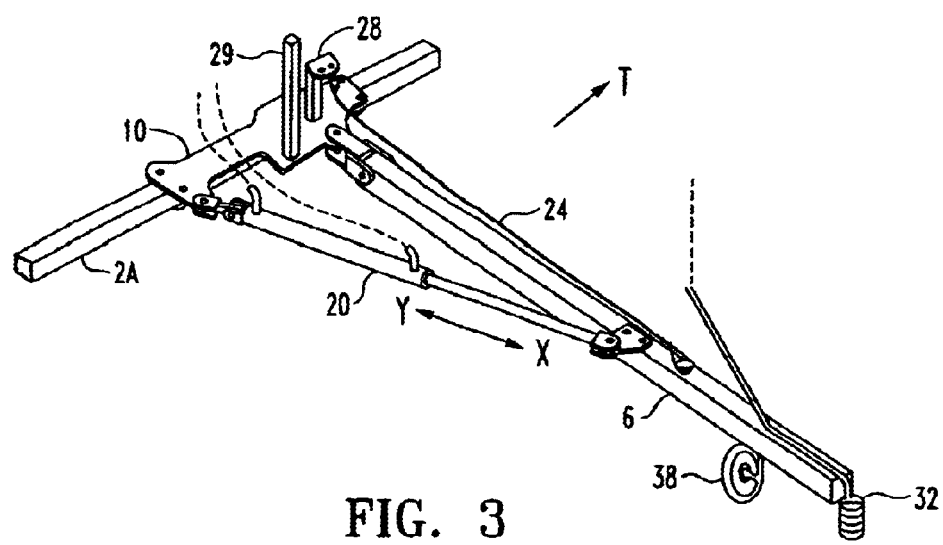
FIG. 3 is a perspective view of the embodiment of FIG. 1 showing an alternate position for the cable tower, and the addition of a cable bracket; mounted on the outer end of an implement.
Figure 4:
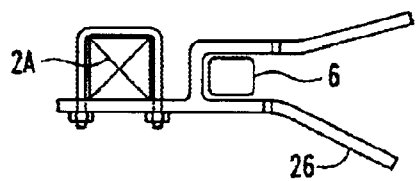
FIG. 4 is an end view of the transport bracket.

Alternatively, in the embodiment illustrated in FIG. 3, the cable tower 28 provides a vertical location above the implement attachment point 8 that may be even with, or behind the implement attachment point 8. A cable bracket 29 is attached to the mounting plate 10 in a fixed position relative thereto such that as the arm 6 moves rearward to the transport position TP, a mid-point of the cable 24 contacts the cable bracket 29. With this configuration as well, as the arm 6 moves rearward towards the transport position TP, the cable 24 tightens and lifts the arm 6 to engage the transport bracket 26.

The length of the cable 24 is adjustable by turning turnbuckle 30 so that the arm 6 will properly engage the transport bracket 26.

The marking device 16 can provide a visible mark 4 in the field by dropping material, such as foam, dye, or paper, periodically onto the field at the distal end 6B of the arm 6 as illustrated by the foam marker 32 in FIG. 3. Such dropping marking devices are not supported on the ground and require a wheel 38 to support the outer end of the arm 6, or a different mount to the implement 2 which will support the arm 6.

Figure 5:
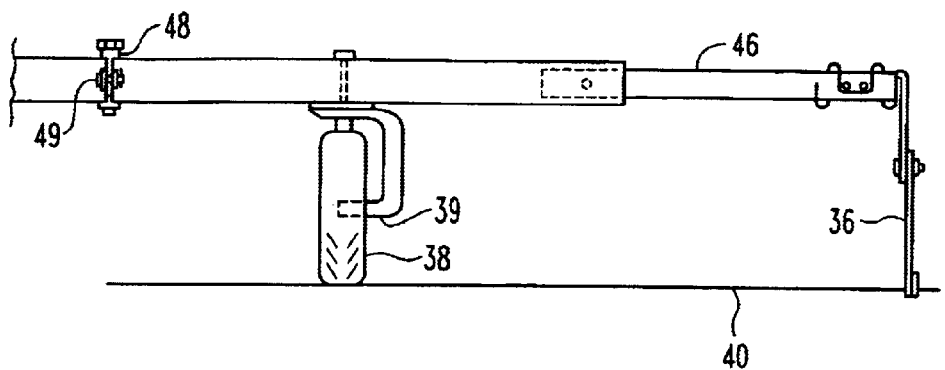
FIG. 5 is a rear view of the end of an arm showing an alternate tooth scoring element.

More commonly, the marking device 16 will be a scoring element operative to score a furrow in the field. In FIG. 1 the scoring element is a disc 34 attached to the distal end 6B of the arm 6. In FIG. 5, the scoring element is a harrow tooth 36 extending generally downwards from the distal end 6B of the arm 6.

As illustrated in FIG. 5, a wheel 38 can be mounted on an axle 39 to support the arm 6. The vertical position of the scoring element, tooth 36, with respect to the wheel 38 can be made adjustable such that a depth of penetration of the tooth 38 into the ground 40 can be varied. In FIG. 5, the tooth 36 is in two pieces joined by a clamp 42 so that the effective length of the tooth 36 can be varied. Alternatively, the wheel 38 could be vertically adjustable.

Figure 6:
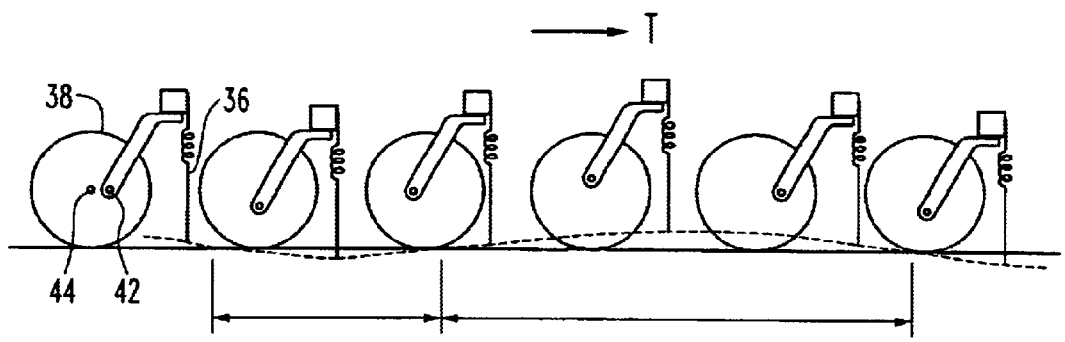
FIG. 6 is a schematic illustration of the action of the wheel and tooth, where the wheel is offset on the axle to provide an intermittent mark.

FIG. 6 illustrates an embodiment wherein the wheel 38 supporting the arm 6 is rotatably attached to the axle 39 at an axis of rotation 42 removed from the center 44 of the wheel 38. With such an offset axis of rotation, as the marker moves along the field the axle 39 and tooth 36 move up and down. The tooth 36, moves down into contact with the field, illustrated as the ground 40, and up out of contact with the field as the marker moves along the field. The resulting intermittent or dashed line is more easily distinguished from pre-existing ridges and the like that may be present in the field, thus increasing accuracy of operations and reducing stress on the operator. Adjusting the vertical position of the scoring element with respect to the wheel will vary the period of contact of the marker with the ground.

The active hydraulic source 22 and cylinder 20 reduce the strength requirements of the arm 6. Since the force holding the arm 6 in the operating position OP can be made just higher than that required by the resistance of the marking device 16, the arm 6 does not have to withstand the larger forces required to shear a pin or release a breakaway mechanism. The arm 6 can therefore be fabricated from plastic, fiberglass, aluminum, or similar lighter materials, further reducing the weight on the outer end 2A of the implement 2.

The arm 6 illustrated in FIG. 5 includes a telescoping section 46 such that the arm 6 has an adjustable length to accommodate various implement sizes, mark locations, and the like. In FIG. 5 the arm 6 also includes a hinge 48 and lock 49 so that the arm 6 can be folded up adjacent to the end of the implement for more compact transport.

Figure 7:
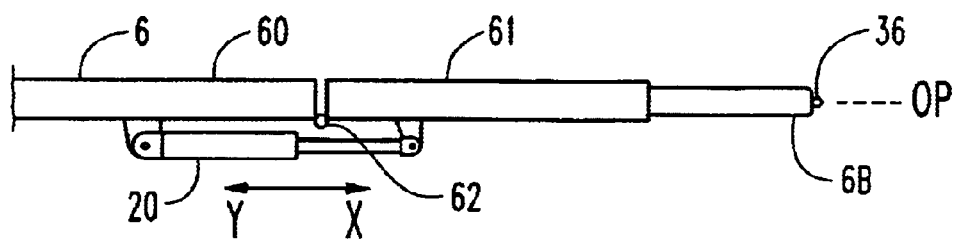
FIGS. 7 and 8 are top views of an alternate embodiment of the marker arm.
Figure 8:
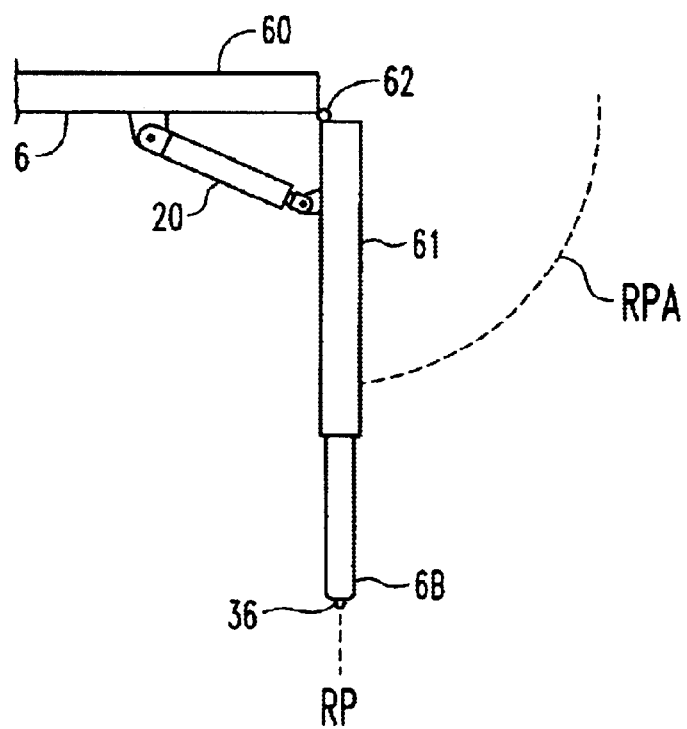

FIGS. 7 and 8 illustrate an alternate field marker arm 6 comprising an inner section 60 and an outer section 61 pivotally attached to the inner section 60 at hinge 62. Hydraulic cylinder 20 is connected between the inner and outer sections. In this embodiment, only the outer section 61, and the distal end 6B of the arm 6 with attached tooth 36 or like marking device, moves from the operating position OP to a retracted position RP on the retracted position are RPA.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A field marker attachable to an agricultural implement for providing a visible mark in the field substantially parallel to a path of the implement and laterally removed from the implement, the marker comprising:
   an arm pivotally attachable at a proximal end thereof to an outer end of the implement at an implement attachment point such that the arm can move up and down to follow contours of the field and such that the arm can move from an operating position, where the arm extends outward from the outer end of the implement, rearward to a retracted position;
   a marking device attached at a distal end of the arm and operative to provide a visible mark in the field below the marking device;
   an extendable hydraulic cylinder operatively connected between the implement and the arm such that the hydraulic cylinder moves in a first direction to a stopped position to move the arm to the operating position, and such that the hydraulic cylinder moves in an opposite second direction when the arm moves to the retracted position;
   an active hydraulic source operatively connected to the hydraulic cylinder to supply hydraulic fluid to the hydraulic cylinder at an operating pressure such that the hydraulic cylinder remains in the stopped position until a rearward force exerted on the arm causes the pressure of the hydraulic fluid in the hydraulic cylinder to exceed the operating pressure, at which time the hydraulic cylinder moves in the second direction and the arm moves toward the retracted position.

2. The marker of claim 1 further comprising a pressure control operative to vary the operating pressure.

3. The marker of claim 1 wherein the hydraulic cylinder is double acting and further comprising a directional control operative to direct hydraulic fluid from the active hydraulic source to move the hydraulic cylinder in the second direction such that the arm is moved rearward to a transport position substantially parallel to the operating travel direction and adjacent to the outer end of the implement.

4. The marker of claim 3 further comprising a mechanism to raise the arm off the ground when the arm is moved rearward into the transport position.

5. The marker of claim 4 wherein the mechanism to raise the arm comprises a cable attachable at a first end thereof to the implement at a vertical location above the implement attachment point and attached at a second end thereof to the arm, the cable operative to raise the arm when the arm moves rearward to the transport position.

6. The marker of claim 5 wherein the arm engages a transport bracket when the arm moves rearward to the transport position.

7. The marker of claim 5 further comprising a cable tower attachable to the implement and wherein the first end of the cable is attached to the cable tower.

8. The marker of claim 7 wherein the cable is attached to the cable tower at a point forward of the implement attachment point.

9. The marker of claim 7 further comprising a cable bracket attachable to the implement in a fixed position relative thereto such that as the arm moves rearward to the transport position, a mid-point of the cable contacts the cable bracket.

10. The marker of claim 5 wherein a length of the cable is adjustable.

11. The marker of claim 5 wherein the marking device is a scoring element operative to score a furrow in the field.

12. The marker of claim 11 wherein the scoring element is a tooth extending generally downwards from the distal end of the arm.

13. The marker of claim 11 wherein the scoring element is a disc attached to the distal end of the arm.

14. The marker of claim 11 further comprising a wheel supporting the arm at an outer portion thereof such that a vertical position of the scoring element with respect to the wheel is adjustable, and such that a depth of penetration of the scoring element can be varied.

15. The marker of claim 11 further comprising a wheel supporting the arm at an outer portion thereof wherein the wheel is rotatably attached to an axle at an axis of rotation removed from a center of the wheel such that the scoring element moves down into contact with the field and up out of contact with the field as the marker moves along the field.

16. The marker of claim 15 wherein a vertical position of the scoring element with respect to the wheel is adjustable such that a period of contact of the marker with the ground can be varied.

17. The marker of claim 1 wherein the marking device provides a visible mark in the field by dropping material periodically onto the field.

18. The marker of claim 1 wherein the arm is fabricated from plastic, fiberglass or aluminum.

19. The marker of claim 1 wherein the arm has an adjustable length.

20. The marker of claim 1 wherein the arm folds up adjacent to the end of the implement.

21. A field marker attachable to an agricultural implement for providing a visible mark in the field substantially parallel to a path of the implement and laterally removed from the implement, the marker comprising:

an arm pivotally attachable at a proximal end thereof to an outer end of the implement at an implement attachment point such that the arm can move up and down to follow contours of the field, a distal end of the arm movable from an operating position, where the distal end extends outward from the outer end of the implement, rearward to a retracted position;

a marking device attached at the distal end of the arm and operative to provide a visible mark in the field below the marking device;

an extendable hydraulic cylinder operatively connected to the arm such that the hydraulic cylinder moves in a first direction to a stopped position to move the distal end of the arm to the operating position, and such that the hydraulic cylinder moves in an opposite second direction when the distal end of the arm moves to the retracted position;

an active hydraulic source operatively connected to the hydraulic cylinder to supply hydraulic fluid to the hydraulic cylinder at an operating pressure such that the hydraulic cylinder remains in the stopped position until a rearward force exerted on the arm causes the pressure of the hydraulic fluid in the hydraulic cylinder to exceed the operating pressure, at which time the hydraulic cylinder moves in the second direction and the distal end of the arm moves toward the retracted position.

22. The marker of claim 21 wherein the arm is substantially rigid from the proximal end thereof to the distal end thereof, and wherein the hydraulic cylinder is connected between the implement and the arm.

23. The marker of claim 21 wherein the arm comprises an inner section and an outer section pivotally attached to the inner section, and wherein the hydraulic cylinder is connected between the inner and outer sections.

24. A field marker attachable to an agricultural implement for scoring a visible mark in the field substantially parallel to a path of the implement and laterally removed from the implement, the marker comprising:

an arm pivotally attachable at a proximal end thereof to an outer end of the implement at an implement attachment point such that a distal end of the arm extends outward from the outer end of the implement in an operating position where the arm can move up and down to follow contours of the field;

a scoring element attached at the distal end of the arm and operative to score a visible mark in the field below the scoring element;

means to raise and lower the scoring element such that the scoring element moves down into contact with the field and up out of contact with the field as the marker moves along the field.

25. The marker of claim 24 wherein the scoring element is a tooth extending generally downwards from the distal end of the arm.

26. The marker of claim 24 wherein the scoring element is a disc attached to the distal end of the arm.

27. The marker of claim 24 wherein the means to raise and lower the scoring element comprises a wheel supporting the arm at an outer portion thereof and wherein the wheel is rotatably attached to an axle at an axis of rotation removed from a center of the wheel.

28. The marker of claim 27 wherein a vertical position of the scoring element with respect to the wheel is adjustable such that a period of contact of the marker with the ground can be varied.

29. The marker of claim 24 wherein the distal end of the arm is movable from the operating position rearward to a retracted position.

30. The marker of claim 29 further comprising an extendable hydraulic cylinder operatively connected to the arm such that the hydraulic cylinder moves in a first direction to a stopped position to move the distal end of the arm to the operating position, and such that the hydraulic cylinder moves in an opposite second direction when the distal end of the arm moves to the retracted position; and an active hydraulic source operatively connected to the hydraulic cylinder to supply hydraulic fluid to the hydraulic cylinder at an operating pressure such that the hydraulic cylinder remains in the stopped position until a rearward force exerted on the arm causes the pressure of the hydraulic fluid in the hydraulic cylinder to exceed the operating pressure, at which time the hydraulic cylinder moves in the second direction and such that the distal end of the arm moves toward the retracted position until the rearward force exerted on the arm is reduced so that the pressure of the hydraulic fluid in the hydraulic cylinder falls to the operating pressure.

31. The marker of claim 30 further comprising a pressure control operative to vary the operating pressure.

32. The marker of claim 30 wherein the hydraulic cylinder is double acting and further comprising a directional control operative to direct hydraulic fluid from the active hydraulic source to move the hydraulic cylinder in the second direction such that the arm is moved rearward to a transport position substantially parallel to the operating travel direction and adjacent to the end of the implement.

33. The marker of claim 32 further comprising a cable attachable at a first end thereof to the implement at a vertical location above the implement attachment point and attached at a second end thereof to the arm, the cable operative to raise the arm to engage a transport bracket when the arm moves rearward to the transport position.

34. The marker of claim 33 further comprising a cable tower attachable to the implement and wherein the first end of the cable is attached to the cable tower.

* * * * *